Figure 1:
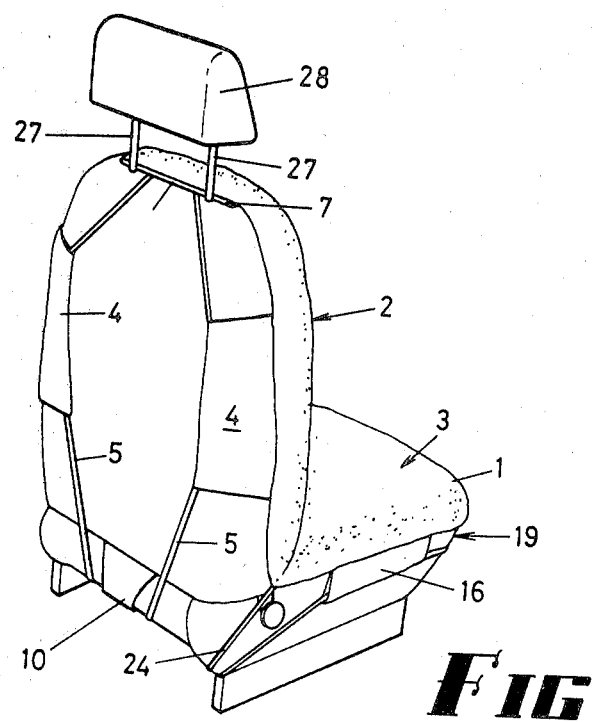

United States Patent [19]

Neilson

[11] 4,396,227

[45] Aug. 2, 1983

[54] CAR SEAT COVERS

[76] Inventor: William W. Neilson, 26 Ramsay Ave., Hillcrest, South Australia, Australia, 5086

[21] Appl. No.: 163,688

[22] Filed: Jun. 27, 1980

[30] Foreign Application Priority Data

Jun. 28, 1979 [AU] Australia .............................. PD9377
Dec. 10, 1979 [AU] Australia .............................. PE1669

[51] Int. Cl.³ ............................................ A47C 27/00
[52] U.S. Cl. ...................................... 297/219; 5/482; D6/48; 297/456
[58] Field of Search ............... 297/219, 229, 223, 452, 297/224, 225, 226, 456; D6/48; 5/497, 482

[56] References Cited

U.S. PATENT DOCUMENTS

| 1,544,141 | 6/1925 | Eddins | 297/219 |
| 1,836,302 | 12/1931 | Bloomfield | 297/229 |
| 1,975,599 | 10/1934 | Fry | 297/226 |
| 2,129,225 | 9/1938 | Mednick | 297/225 X |
| 2,373,071 | 4/1945 | Waranch | 297/219 X |
| 2,822,862 | 2/1958 | Zacks | 297/229 |

FOREIGN PATENT DOCUMENTS

| 272592 | 7/1964 | Australia | 297/219 |
| 402446 | 10/1969 | Australia | 297/229 |
| 2239080 | 2/1975 | France | 297/229 |

OTHER PUBLICATIONS

L. L. Bean Catalog; Spring 1978; p. 119.

Primary Examiner—James T. McCall
Attorney, Agent, or Firm—Pearne, Gordon, Session, McCoy, Granger & Tilberry

[57] ABSTRACT

A car seat cover comprised of sheep skin with wool attached thereto and including fitting means making it suitable for universal fitting to a variety of different sizes of car seats and including appropriately located sleeves and fixed attachments for cords resiliently connected thereto to provide holding for the cover on a car seat.

11 Claims, 4 Drawing Figures

CAR SEAT COVERS

This invention relates to car seat covers and in particular to means and to a method of holding such car seat covers with relation to car seats.

Particular problems are experienced in securing car seat covers where the material substance of the car seat cover comprises a skin such as a soft skin supporting wool.

There are a number of quite difficult aspects related to the holding of such a skin onto a vehicle seat the first of these being that the skin must be generally able to be held closely over the front of the seat this of course including the seat portion and the back portion of the seat. Secondly neither the fitting method nor the skin itself should be subject to undue strain which can permanently damage the skin causing it to buckle and the appearance and fitting becomes distorted and finally the appearance of the cover together with the fitting must be of an acceptable appearance especially where the manufacturer has to sell such covers in competition with other designs.

One of the problems presently experienced is that while these criteria can be achieved either at high cost which means individually tailoring each cover for a particular car seat, it has been very difficult to propose a system for fitting of a car seat cover which has the following features these being that is economic to produce and therefore comparatively inexpensive as compared to other car seat covers, that it can be fitted without excessive skill being required and that the fitting can be made to tightly conform with the seat regardless generally of significant variations in size of the seat.

This invention relates to a preferred arrangement and method for holding such covers where these are intended to secure the portion of the cover that lies against the seat back. In one case the seat back is of a type known as a low back either with or without a head rest including a stem or stems extending from the top of the low back portion of the seat to a head restraint device.

The problems of securing such car seat covers are now well known and include the difficulty of supporting the cover against forces such as the force pulling the cover downward when the person using the seat sits upon this which has the result of applying significant pressures in a downward direction on the seat back.

This is especially the case when the cover is made as one piece, that is including a back and seat portion combined although the difficulties do also apply to some extent where the seat back cover portion is separate from the seat portion.

Using any fixed securement method such as flexible metal strips which are deformed to follow the shape of the back or to positively tie the cover material in place with fixed strappings can lead to either a straining of these beyond their limit or to a distortion of the skin or a displacement of the cover after some use to a situation where the cover must be relocated from time to time or perhaps the fixings themselves are mutilated or destroyed.

There are also further factors including the general appearance of any securement method including also access to back pockets in seats or to ashtrays often secured in the back of a car seat and all of these are relevant problems in relation to the design of any fixing method.

The invention can be said in one form to reside in a car seat cover comprised, at least in the main, of a woolly sheepskin of a size adequate to cover both the front of the car seat back and the seat of the car seat, the portion of the cover adapted to fit across the back of the car seat including a plurality of sleeves adapted to extend to a side of the seat and located around the periphery of this back portion and there being a cord resiliently connected and passing collectively through each of the sleeves, means at each of the cord to engage a portion of the seat to hold the back portion against the seat thereby, and a portion of the cover being adapted to fit the seat of the car seat including a plurality of sleeves extending from the periphery of the skin forming the cover portion and there being a separate cord resiliently connected passing through each of the sleeves and adapted so that each end can be held to the seat in which a cover is to be held.

Preferably, at an upper end of the cover, the cord is secured in a fixed manner to an upper portion of the skin and the length and shape of the skin and the fixing location is such that the skin will in practice in relation to the seat in respect of which the cover is adapted to be fitted to, be pulled over and down the back side of the back portion of the seat.

An important aspect of this invention relates to the arrangement of the skin itself and the way in which this is cut from a skin and a further aspect of this invention relates to the location of the sleeves themselves whereby to provide effective pulling of the skin especially in relation to seat backs generally known as high back seats which provide rest for the head of a person as well as the back.

A further aspect of this invention relates to the location of the uppermost portion of the skin so that this in fact wraps over the top and partially down the other side of the high back portion of the seat and that the cord attached thereto is securely attached thereto.

Describing then the further location of the sleeves, the sleeves are positioned so that there are two sleeves one to each side of the uppermost central location and adapted to fit around the corner shape that is where the angle between the two side portions of the back are providing an included angle and the length of each sleeve is such that the skin while remaining and having the securement point forward of the seat will have the outer end of the sleeve behind the seat so that the cord having an upper end secured to a flap extending over the top of the seat will pass down maintaining its position behind the seat but then passing through this first sleeve.

There is then a second sleeve which is somewhat longer than the first said sleeve and preferably is shaped so as to have an arcuate shape on its outer edge that is provided by the sleeve shape and its inner end is secured to a flap in this case formed by the skin so that in effect some woolly side of the skin is pulled around and is held against the side of the seat to provide a wrapped around appearance.

The location of the outer end of the sleeve that is the second mentioned sleeve which is lower than the first mentioned sleeve and fits around the straighter side of a seat back is then fully behind the back of the seat back and the cord passing from the upper flap through the first sleeve then passes also through the second sleeve and at a lowermost position is hooked onto or otherwise adhered onto a lower portion of the seat.

The concept of then providing at least two sleeves that is one on each side which is located so as to fit within the included angle found to exist on a high back provides positive location for the upper part of the skin and by securing the skin tightly around this upper portion ensures a very neat fit and the fitting becomes very much simpler and it means that in practice the normal customer can fit such a seat himself rather than as hitherto been necessary namely that the skin has had to be fitted by people trained in the art.

According to a further form of this invention, this proposes a car seat cover comprised as before with in the main, a deformable material providing the facing for the cover, the cover including for the portion adapted to be a cover of a car seat back a portion adapted to cover the car seat back, and secured so as to extend around the car seat back and to each side of this, two sleeves one on each side each having threaded therethrough a cord resiliently connected and being arranged so that each sleeve when secured to a seat can move in an upward or downward direction relative to the cord the cord in each case being secured at an upper end to a sleeve extending across an upper edge of the deformable cover material the sleeve being sufficiently stiffened or including means such as a rod or other device to provide a cross-stiffening of the sleeve so as to transmit any pulling pressure exerted by the straps across the full width of the top of the cover material.

A lower end of each of the cords is adapted to be secured to a lower location in relation to the car seat either by hooking onto some of the upholstery or otherwise and the whole of the arrangement then is such that if there is any downward pressure on the car seat cover material, the cords which will include resilient material so as to provide resilient flexibility will allow more relative movement between the cord and the sleeve.

Perhaps importantly relative to this particular invention, is the fact that the cord (this term wherever used being used to include straps, lines, string or the like) in each case is secured at one location to an upper edge of the covering material but that with respect to the two cords therefore that are located perhaps some six to eight inches apart there is a stiffener preferably a rod of wire which extends some twelve inches across the top of the covering material and which is secured within a sleeve but by which the straps holding the covering material in place also hold the covering material both tight and stop this from curling fowardly and therefore in an unsightly manner downwardly.

Where the cover material is to be used in one piece so as to cover both the seat and the back portions of the car seat, a difficulty does lie in relation to tucking the cover material in at the join between the back and the seat.

It will be appreciated that, to keep the appearance neat, it is important that both the back cover portion and the seat cover portion be held tightly in toward the joining location.

To achieve this in practice is a difficulty but according to this invention there is proposed a single strap forming a flap secured at spaced apart location so as to in effect form a sleeve with the ends of the flap spaced apart a significant distance and a rod is located within the sleeve and a central part of the rod is secured and a strap passes through an aperture in the sleeve the strapping either being or including a resilient portion and being adapted to be held with respect to the seat by being located through a location between the seat back and the seat portion of the car seat.

By having the flap appropriately located that especially having its ends spaced apart so that one end extends at least partly up the back portion of the cover and the other extends forwardly into the seat portion of the cover and that both of these then pull appropriately on the respective portions of the cover.

There can be other means for holding of the seat cover material in such a way although it is a preferred method to have the two ends of a sleeve arranged in such a manner and preferably this is held in the manner described where the sleeve itself is secured over perhaps three or four inches at the centre of the cover material that is centrally between the sides.

The fixing of the lower portion of the cover that is the seat portion is by way of sleeves which are located so that the resilient cord passing collectively through all of the sleeves is secured in a position behind the seat so that the restraining pressure is such that the seat portion is held by pressure pulling back on the skin.

The cords in each case are independent that is in relation to the back portion and the seat portion the pressures required in each case being different and the resiliency can be achieved either by making the cord overall resilient or having a link comprised of an elastic type material to provide such resilience.

Now referring to the construction of the skin itself it has been found preferable to provide that the skin in the main is provided with rectangular panels which are cut from a centre portion of the skin and the sides are extended by having generally arcuate portions extending out to the side which are cut from sides of skins otherwise not used.

It is found in practice that by using a conventional rectangular shape, two or three such rectangular shapes can be most economically taken from skins and made into a long portion forming the major body of the car seat cover and additional panels to the side which perhaps need only be four to five inches in width can be additionally attached to such elongated panels.

The selection of such location of side pieces can be such as to provide suitable wrap around location and give a good appearance at the back of the seat and the same with the seat portion of the seat.

Figure 2:
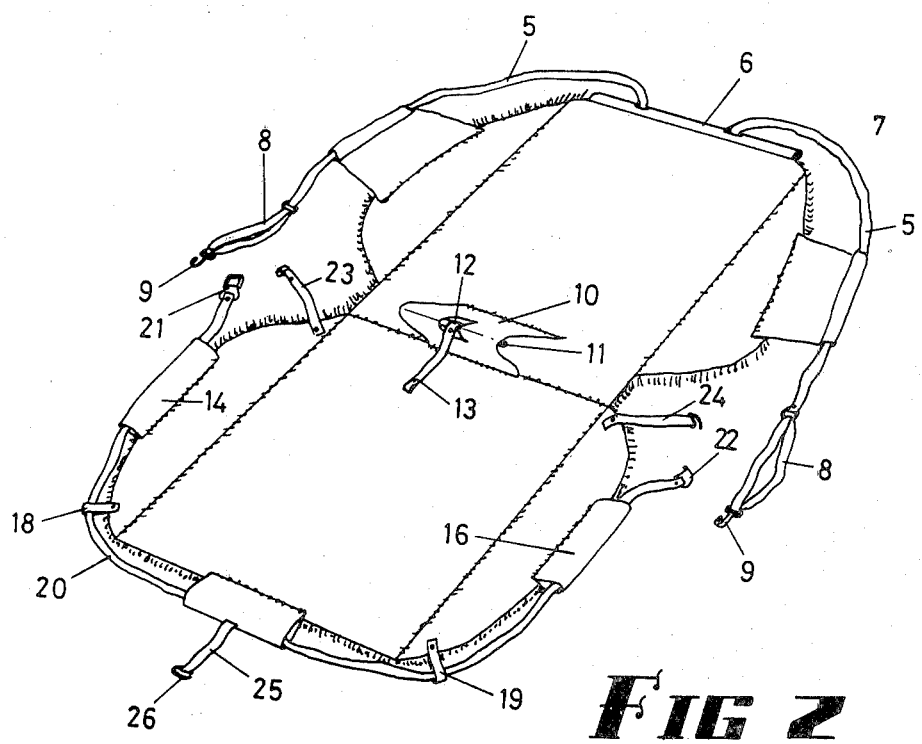
Figure 3:
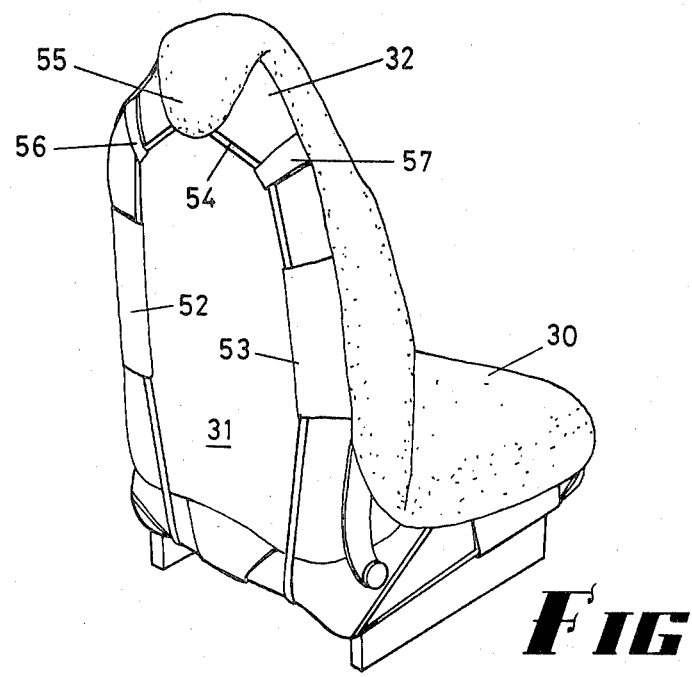
Figure 4:
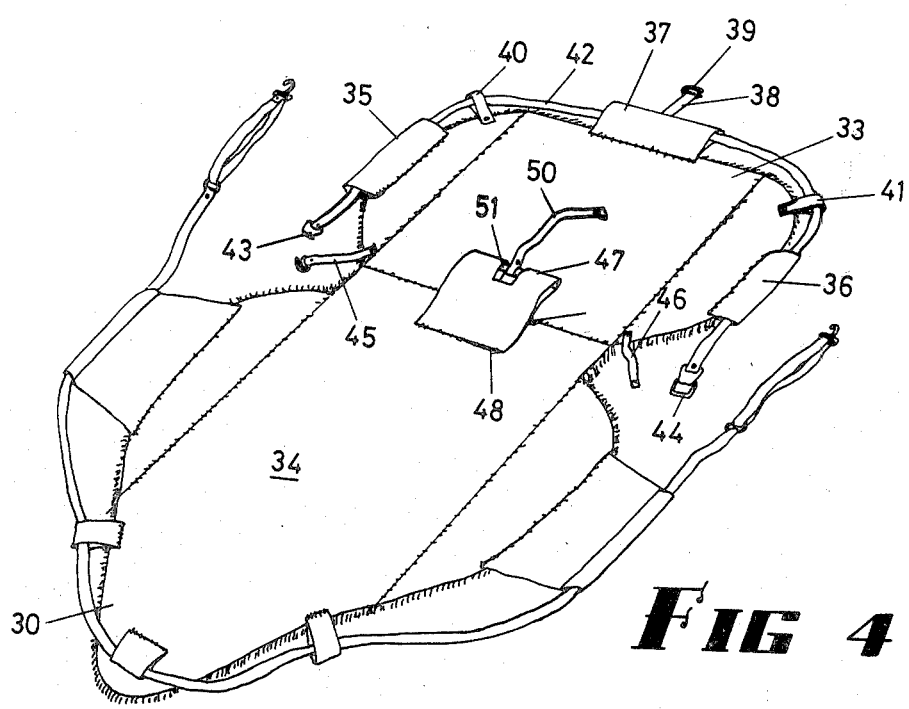

Preferred embodiments shall now be described with the assistance of drawings in which:

FIG. 1 is a perspective view of a seat of a typical motor car having the cover according to the first embodiment secured thereto, FIG. 2 is a view of the cover according to the first embodiment as in FIG. 1 in this case however the cover being laid out and being viewed from the underneath side showing the various sleeves and attachments, FIG. 3 is a perspective view from the rear of a seat having a cover according to the second embodiment attached thereto and FIG. 4 is a perspective view of the cover according to the second embodiment as attached to the seat in FIG. 3 in this case being viewed from the underneath side as laid out showing the various sleeves and attachments thereto.

In relation to a first preferred embodiment, the seat covering material of the cover 1 is a sheepskin with an appropriately treated wool outer surface.

The seat covering material is intended as a one piece cover to fit against the face of the seat back 2 and also the upper surface 3 of the seat portion of the car seat.

The back portion of the covering includes two side sleeves 4 positioned so as to have the sleeve portion aligned in a more or less upward direction and located just around the side of the seat back 2 to which the cover 1 is to be attached so that a strap 5 can extend through the sleeve 4 and be secured in approximately a direct line to an uppermost sleeve 6 secured to an uppermost portion of the sheepskin material.

This uppermost sleeve 6 extends across substantially a full width of the cover material which is approximately fifteen inches wide and there is located a reasonably stiff rod 7 extending therethrough so as to both distribute any holding pressure across the full width of the cover material 1 and to also hold this from curling either fowardly or downwardly.

The straps 5, in each case, are secured through apertures in the sleeve 6 directly onto the rod 7 and are located approximately a third the distance in from each end of the rod 7.

Each of the straps 5 extending through the side sleeves 4 include at a lower end a resilient section 8 of elastic and are adapted to be secured by hooks 9 into a suitable part of the framework of the seat.

Located somewhat midway along the length of the cover material 1 and to its back is a flap 10 having a width of approximately five inches and being located centrally between the sides of the cover material and being secured with one edge three inches above the other.

The position of these locations is such that when in position and with the strap being pulled between the seat back 2 and seat portion 3 of the car seat these will appropriately pull down on the seat back portion and pull back on the seat portion of the cover material 1.

There is a rod 11 passing between the sides of the flap 10 so attached and through a central aperture 12 having a strap 13 holding this rod 11 and this strap 13 being of a resilient material extending and being hooked onto a suitable part of the seat to apply continuous resilient pressure as described.

The seat portion 3 of the car seat cover includes three sleeves 14, 15 and 16 one to each side 14 and 16 and one 15 at a front end, each adapted to extend down and partly below an upper edge of the seat portion of the seat and in this embodiment there are additional locating loops 18 and 19 at each forward corner the three sleeves 14, 15 and 16 and the locating loops 18 and 19 being interleaved by a single resilient strap 20 each end 21 and 22 of which is adapted to be held rearward and lowermost with respect to the seat.

There is an additional strap 23 and 24 at each side of the seat portion adapted to pull downwardly and rearwardly on the seat portion of the cover and finally at the forward flap 15 there is an additional hold-down strap 25 which is secured to a rod (not shown) passing through the said sleeve the strap being secured to the rod through a central aperture and the strap 25 having a hook 26 which is adapted to fit to an appropriate portion of the upholstery of the seat.

Each of the sleeves or flaps is made from cloth-backed vinyl material and the straps are made from a webbing-type material of approximately an inch in width and likewise the locating loops 18 and 19 at each forward corner of the seat portion are made from elastic strapping.

This then describes the first embodiment it being appreciated that the application is to a sheepskin with wool attached but the application is not necessarily limited to this type of material but it will work also with other deformable material if this is considered necessary or useful.

Having described the seat cover itself, the application of course is to secure this to a seat and it will now be appreciated that in use, the stiffened portion at an uppermost end of the cover is adapted to be pulled hard against the stems 27 of any head restraint 28 attached to the low back style of seat.

The stiffened portion of the sleeve 6 this being achieved by a rod, will now be clearly seen to provide significant advantage both in respect of holding all of the corners and top edge in place, providing a stop location relative to any stem or stems supporting a head restraint and finally distributing a pulling pressure over the uppermost portions of the cover material.

Referring now to FIGS. 3 and 4 this shows the second embodiment which is a cover shown at 30 which is specifically suited for a style of seat known as a high back which is shown in FIG. 3 that is there is an extension of the back portion of the seat shown at 31 which narrows to provide a narrower head rest portion 32.

The cover 30 in other respects is the same as the first embodiment incorporating a seat portion 33 and a back portion 34.

The seat portion includes three sleeves namely 35 and 36 being side sleeves and 37 being a front sleeve which includes a strap 38 with a hook at its outer end 39 secured to a rod which is not shown.

There are locating loops 40 and 41 and a continuous strap 42 passing collectively through the sleeves and the locating loops the strap 42 having at each end a hook 43 and 44.

There is a pull down strap 45 at one side and at the other 46.

Within the centre of the back of the cover is a tightening flap 47 which is secured at an upper end at 48 and at a lower end 49 by which with pressure on strap 50 through the stiff rod 51 both the upper portion 34 and the lower portion 33 can be pulled through the nip between the respective back and seat portions of the car seat.

The feature which distinguishes this particular embodiment relates to the arrangement by which the back portion of the cover is held to the unitary structure in such a way that the cover will be held firm to the back and the arrangement is such that despite significant differences in sizes and shapes of back of this high back type structure, and the same seat with the same arrangement can be easily fitted and held tight to these.

This is achieved in part by using the three sleeve holding arrangement that is the two side sleeves 52 and 53 and securing the strap 54 which passes through these and which is allowed to move freely through these with respect to an extended fold down flap 55.

Positive securement is assisted significantly by two small sleeves 56 and 57 which are adapted and located so as to fit around a corner shape which is the location where the two side portions of the back provide an included angle and the length of each sleeve 56 and 57 is such that the skin while remaining and having the securement point forward of the seat will have the outer end of the sleeve behind the seat so that the strap 54 having an upper end secured to the flap 55 will pass down the back maintaining its position behind the seat but then passing through this first sleeve.

This then provides what might be termed an adjustable neck that locks itself around the upper narrower portion of the head of the seat but which will adapt to a variety of shapes and sizes while still providing much the same action.

Perhaps even more importantly with respect to both embodiments now described, each allows for movement of the seat portion of the seat to move downward without undue stretching of the skin being caused that is there will always be a certain amount of takeup by reason of the respective flaps either 47 or 10 allowing some give and in the event that the back portion in each case is pulled down, this is allowed without pulling of the fitting straps by reason of relative movement of each of the sleeves with respect to the strap and furthermore the arrangement allows access to back pockets which while not shown are conventional in the back of the seat of a motor vehicle.

The designs described then show an arrangement by which in an economic and convenient manner, fitting means can be applied to a material such as a soft wool coated skin and which will allow tight and almost tailor-like fitting without the necessity for a person who is skilled in the area of fitting to fit this to a large variety of different sizes and shapes of car seats.

I claim:

1. A car seat cover of a type including a wooly sheep skin of a size adequate to cover both the front of a car seat back and the seat of a car seat, the cover being characterized in that a back portion of the cover is adapted to fit across the front of the back of a car seat and a seat portion of the cover is adapted to fit onto the seat of the car seat, said back portion extending over the front of the back of the car seat and including an upper region adapted to be located adjacent the top of the back of the car seat, said back portion also including a plurality of back sleeves extending from a periphery of the back portion of the cover, each back sleeve being adapted to extend to a side of the seat to which it is to be affixed and to the back of the car seat at spaced locations disposed across the back of the car seat, and a back cord resiliently connected and passing collectively through each of the back sleeves, said back cord being arranged to engage the cover adjacent said upper region thereof and to extend downwardly in substantially vertical orientation through said back sleeves at said spaced locations remote from the sides of the seat, means at each end of the back cord adapted to engage a portion of the car seat and thereby to hold the back portion against the seat by resiliently pulling down the upper region of the cover and laterally tensioning the back portion across the front of the car seat while allowing relative upward and downward movement between the back cord and the back sleeves, said seat portion of the cover including a plurality of seat sleeves extending from a periphery of the seat portion of the cover, and a separate seat cord resiliently connected passing through each of the seat sleeves and adapted to have each end thereof held to the seat independent of the back cord.

2. A car seat cover as in claim 1, wherein the car seat is of the high back type and the cover is further characterized in that the back cord is secured in a fixed manner to the upper region of the back portion of the cover, and the length and shape of the cover and fixing location of the back cord is such that the upper region of the back portion is adapted to be pulled over an uppermost edge of the car seat and partially down the back side of the car seat.

3. A car seat cover as in claim 1 or 2, further characterized in that the back portion of the cover includes two locating sleeves, one being secured to each lateral side of the back portion, each of said locating sleeves being adapted to extend to the back of the car seat at spaced locations and to be disposed across the back of the car seat, said locating sleeves extending in directions which provide an included angle enclosing an upper head support structure of the car seat, and the back cord extends through said locating sleeves so as to provide positive location for the cover with respect to the car seat back.

4. A car seat cover of a type including a deformable material providing the facing for the cover, the cover including a back portion adapted to cover a back of a car seat and a seat portion adapted to cover a seat of the car seat, said back portion extending over the front of the back of the car seat and including an upper region adapted to be located adjacent the top of the back of the car seat, said back portion being adapted to be secured so as to extend around the car seat back to each side thereof and having a back sleeve on each side of the back portion of the cover, each back sleeve being adapted to extend to a side of the seat to which it is to be affixed and to the back of the car seat at spaced locations disposed across the back of the car seat, each back sleeve having threaded therethrough a back cord resiliently connected and arranged so that each back sleeve can move in an upward or downward direction relative to the said cord when the cover is secured to the car seat, each of the back cords being secured at an upper end thereto to a stiffened sleeve extending across an upper edge of the deformable cover material, the stiffened sleeve being sufficiently stiffened to transmit any pulling forces exerted by the back cords across a significant width of the top of the cover material, each of said back cords being arranged to extend downwardly from said stiffened sleeve in substantially vertical orientation through its associated back sleeve remote from the sides of the seat, means at a lower end of each of the back cords adapted to engage a portion of the car seat and thereby to hold the back portion against the seat by resiliently pulling down the upper edge of the deformable cover material and laterally tensioning the back portion across the front of the car seat while allowing relative upward and downward movement between each of the back cords and its associated back sleeve.

5. A car seat cover according to claim 4, further characterized in that the seat portion of the cover includes at least two side seat sleeves extending from a periphery of the cover material and one front seat sleeve extending from a periphery of the cover material, and a separate seat cord passing through each of the said seat sleeves and being adapted to engage behind and below such cover material when on the seat of the car seat so as to both pull back and down with respect to each of the seat sleeves.

6. A car seat cover according to claim 5, in which the seat portion of the cover includes a resilient strap on each side thereof, each of the straps being adapted to be secured to a part of the car seat and to pull the cover material back and downwardly with respect to the car seat.

7. A car seat cover according to claim 6, in which the cover includes a flap secured to a back side of the cover at an approximately midway location, said flap being adapted to pass between the back and seat portions of the car seat and to be attached to a portion of the car seat so as to resiliently bias the cover material.

8. A car seat cover according to claim 7, in which said flap is secured to both an upper and lower location with respect to the cover so that it is resiliently biased both downwardly with respect to a seat back portion of the car seat cover and rearwardly with respect to a seat portion of the car seat cover.

9. A car seat cover according to claim 7 or 8, in which the flap includes a stiffening cross member to which a flap strap is secured.

10. A car seat cover according to claim 4, 5, 7, or 8 in combination with the car seat.

11. A car seat cover of a type including a wooly sheep skin of a size adequate to cover both the front of a car seat back and the seat of a car seat, the cover being characterized in that a back portion of the cover is adapted to fit across the front of the back of a car seat and a seat portion of the cover is adapted to fit onto the seat of the car seat, said back portion extending over the front of the back of the car seat and including an upper region adapted to be located adjacent the top of the back of the car seat, said back portion also including a plurality of back sleeves extending from a periphery of the back portion of the cover, each back sleeve being adapted to extend to a side of the seat which it is to be affixed and to the back of the car seat at spaced locations disposed across the back of the car seat, and a back cord resiliently connected and passing collectively through each of the back sleeves, said back cord being arranged to engage the cover adjacent said upper region thereof and to extend downwardly in substantially vertical orientation through said back sleeves at said spaced locations remote from the sides of the seat, means at each end of the back cord adapted to engage a portion of the car seat and thereby to hold the back portion against the seat by resiliently pulling down the upper region of the cover and laterally tensioning the back portion across the front of the car seat while allowing relative upward and downward movement between the back cord and the back sleeves, said seat portion of the cover including a plurality of seat sleeves extending from a periphery of the seat portion of the cover, a separate seat cord resiliently connected passing through each of the seat sleeves and adapted to have each end thereof held to the seat independent of the back cord, and flap means secured to a back side of the cover at an approximately midway location, said flap means being adapted to pass between the back and seat portions of the car seat and to be resiliently attached to a portion of the car seat, the flap means including a pair of flap members adapted to be centrally located between the sides of the seat, said flap members being respectively secured to upper and lower locations with respect to the cover so that the cover is resiliently biased both downwardly with respect to the back of the car seat and rearwardly with respect to the seat portion of the car seat.

* * * * *